N RICHARDSON.
Thill-Coupling.
No. 36,916.
Patented Nov 11, 1862.
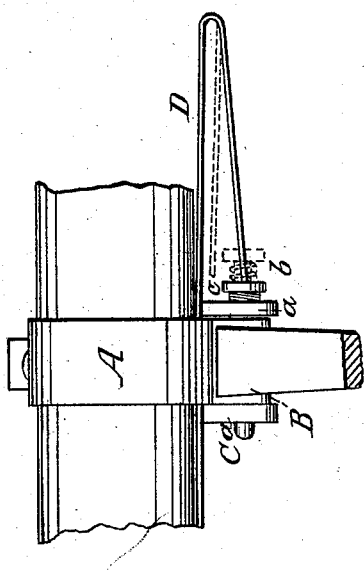
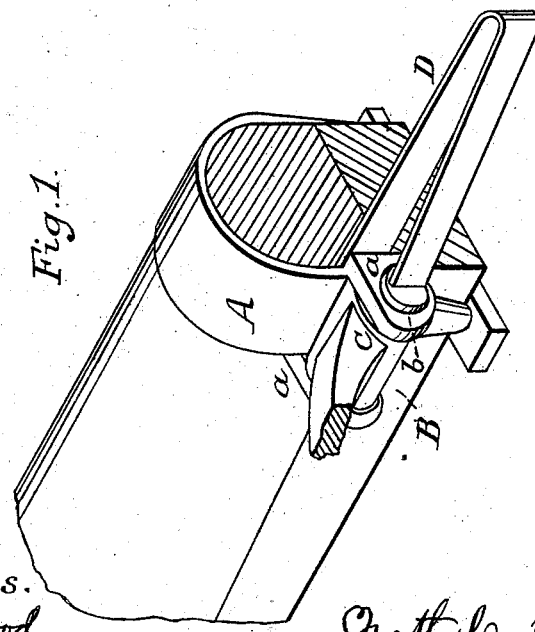
Witnesses.
R. F. Osgood
J. B. Hobbs
Inventor.
Nath'l C. Richardson
by J. Fraser Keo. Att'ys

UNITED STATES PATENT OFFICE.

NATHANIEL RICHARDSON, OF BYBERRY, PENNSYLVANIA.

IMPROVEMENT IN COUPLING THILLS TO AXLES.

Specification forming part of Letters Patent No. 36,916, dated November 11, 1862.

*To all whom it may concern:*

Be it known that I, NATHANIEL RICHARDSON, of Byberry, in the county of Philadelphia and State of Pennsylvania, have invented a new and useful Improvement in Coupling Thills to the Axles of Carriages; and I do hereby declare that the following is a full and exact description thereof, reference being had to the accompanying drawings, making part of this specification.

Figure 1 is a perspective view of my improved clip secured to the axle of a carriage; Fig. 2, a plan of the same; Fig. 3, a view of the coupling-bolt and its coiled spring detached.

Like letters designate corresponding parts in all the figures.

In the ordinary clip the bolt coupling the thills to the axle is secured by a nut screwing on its end. By the constant action and jar this nut is very liable to work loose and fall off, thus uncoupling the parts; or, if it does not fall off, it invariably becomes turned sufficiently to loosen the bolt so as to produce a constant and disagreeable rattling.

It is the object of my improvement to avoid both these difficulties by dispensing with the nut entirely, and holding the bolt securely and rigidly in place by means of two springs connected therewith, the one for resting against its head to prevent its slipping out, and the other for reacting against its head in the opposite direction and preventing it from rattling.

The clip A proper is of ordinary construction, and the joint-socket B of the thills is secured between its bearings *a a* in the usual manner, and coupled by means of a simple plane bolt, C, provided with a head, *b*. Instead of being cut with a screw-thread on its end and held by a nut, it is retained in place by the end of a flat bent spring, D, of suitable size and substantially of the shape represented in the drawings, resting against its head. The base of this spring is suitably secured by welding or otherwise to the clip itself, thus forming a part of it. On the inside of the head of the coupling-bolt, and resting between it and the bearing *a* of the clip, is situated a coiled spring, *c*, or its equivalent, (such as india-rubber,) of suitable size, encircling the bolt and pressing its head outward against the end of the spring D. The bolt thus secured is always retained in place, as its only action on the spring D is the end pressure, which is but slight, and the latter has sufficient stiffness to sustain it in position under all circumstances. The bolt, therefore, cannot drop out by any ordinary accident. The coiled spring *c* at the same time, by reacting or pressing the head of the bolt back against the end of the retaining-spring with sufficient force, not only prevents its working longitudinally, but also keeps it form turning, and by thus locking and retaining it firmly in place obviates most effectually the rattling, which is unavoidable in all other clips with which I am acquainted.

This device is very cheap and simple, and accomplishes perfectly the object for which it is intended. When the spring D is depressed, as indicated by the red lines in Fig. 2, the coupling-bolt is thrown back by the reaction of its coiled spring, so as to be easily and most expeditiously removed from its place for detaching the thills or for repairs, or any other purpose. In this respect the device is far superior to the ordinary one, to uncouple which the bolt has to be held from turning while the nut is removed, a labor requiring considerable time and effort. The retaining-spring D, by being attached to and forming a part of the clip itself, can never become loose and drop off, as it would do if secured separately to the axle; but being thus combined in a whole, the device is in the most compact form for packing for the trade, as well as for use.

What I claim as my invention, and desire to secure by Letters Patent, is—

Retaining the coupling-bolt C in place and preventing its rattling, and at the same time allowing it to be easily and expeditiously inserted or removed by means of the retaining-spring D, resting against it, and the coiled spring *c*, or its equivalent, reacting to throw it outward, the whole arranged, combined, and operating substantially as herein set forth.

In witness whereof I have hereunto signed my name in the presence of two subscribing witnesses.

NATHL. RICHARDSON.

Witnesses:
 CHARLES COMLY, Jr.,
 JOHN KEENAN.